Patented July 4, 1933

1,916,584

UNITED STATES PATENT OFFICE

WILHELM PUNGS, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

IMPREGNATING AND ADHESIVE COMPOSITION

No Drawing. Application filed December 5, 1927, Serial No. 237,995, and in Germany December 8, 1926.

I have found that impregnating and adhesive compositions possessing excellent properties are obtained by heating stearine pitch, or similar pitches, together with natural non-mineral oils of vegetal origin, that is vegetable or animal oils which may have been subjected to an oxidizing or polymerizing preliminary treatment, or both, with sulfur or substances giving off the same, and by adding, before, during or after this treatment, substances comprising organic sulfur compounds and obtained by extracting a tar from a bituminous coal with the usual organic solvents, containing oxygen such as alcohols, and also adding, as required, natural or artificial asphaltums, tars, other kinds of pitch, resins or fillers, or several of such substances, the heating being continued. Sulfurous chlorid may be mentioned, for example, as an agent giving off sulfur. Several sulfurizing agents may also be used, as for example, sulfurous chlorid in the first stage and sulfur for the completion of the treatment. Typical and preferred extraction products from tar comprise mixtures containing unsaturated, hydroxylated, sulfur bearing compounds, similar to the commercial product known as "Fresol". The addition of the tar extracts renders the otherwise viscous impregnating and adhesive compositions more easily workable which is important in the case of numerous applications.

The products obtained according to the present invention are elastic and are distinguished by their powerful adhesive properties and their high capacity for resisting heat and cold, which are of great value, for example, for the impregnation of textile materials, papers, pasteboard and the like or in the manufacture of cables or insulating masses.

On heating, the composition containing tar extract gradually becomes tougher, and the heating may be interrupted when any desired degree of toughness is attained. The method of working herein described may be modified in a great variety of ways. For example, the tar extract may be added at the moment the composition begins to thicken during the sulfurizing stage, or the tar extract may be added gradually in separate portions, this method enabling the reaction temperature to be easily controlled at the same time.

The following example will further illustrate the nature of the said invention which however is not limited thereto. The parts are by weight.

Example 130 parts of stearine pitch, 20 parts of wood oil, 50 parts of whale oil and 45 parts of sulfur are heated at about 160° C. and stirred until a viscous mass, which becomes dry when cold, is formed. 60 parts of a tar extract obtained by treating brown coal tar with 96 per cent alcohol, are then added, and the now fluid product is heated further until the desired degree of viscosity is attained.

What I claim is:

1. As a new article of manufacture, an impregnating and adhesive composition comprising a heat reaction product of a pitch of the nature of stearine-pitch together with oil of vegetal origin, a sulphur-supplying body and an organic sulphur-bearing substance extracted from a tar of a bituminous coal with an organic alcoholic solvent.

2. A process for manufacturing impregnating and adhesive compositions which comprises heating pitches of the nature of stearine pitch together with oils of vegetal origin, sulphur supplying bodies and products extracted from tars of bituminous coal by means of an organic alcoholic solvent and comprising organic, sulphur bearing compounds.

3. A process for manufacturing impregnating and adhesive compositions which comprises heating pitches of the nature of stearine pitch together with oils of vegetal origin, sulphur supplying bodies and products extracted from tars of bituminous coal by means of an alcohol and comprising organic, sulphur bearing compounds.

4. A process for manufacturing impregnating and adhesive compositions which comprises heating pitches of the nature of stearine pitch together with oxidized oils of vegetal origin, sulphur supplying bodies and products extracted from tars of bituminous coal by means of an alcohol and comprising organic, sulphur bearing compounds.

5. A process for manufacturing impregnating and adhesive compositions which comprises heating pitches of the nature of stearine pitch together with oxidized and polymerized oils of vegetal origin, sulphur supplying bodies and products extracted from tars of bituminous coal by means of an alcohol and comprising organic, sulphur bearing compounds.

6. A process for manufacturing impregnating and adhesive compositions which comprises heating pitches of the nature of stearine pitch together with oils of vegetal origin, sulphur supplying bodies and products extracted from brown coal tar by means of an alcohol and comprising unsaturated, hydroxylated, sulphur bearing organic compounds.

7. A process for manufacturing impregnating and adhesive compositions which comprises heating pitches of the nature of stearine pitch together with oxidized and polymerized oils of vegetal origin, sulphur supplying bodies and products extracted from brown coal tar by means of an alcohol and comprising unsaturated, hydroxylated, sulphur bearing organic compounds.

8. A process for manufacturing impregnating and adhesive compositions which comprises heating pitches of the nature of stearine pitch together with oxidized and polymerized oils of vegetal origin, sulphur supplying bodies and products extracted from brown coal tar by means of an alcohol and comprising unsaturated, hydroxylated, sulphur bearing organic compounds, and adding matters selected from the group consisting of artificial and natural asphaltum, other kinds of pitch and resins during the heat treatment.

9. A process for manufacturing impregnating and adhesive compositions which comprises heating stearine pitch together with wool oil and whale oil, sulphur and a product extracted from brown coal tar by means of ethyl alcohol.

In testimony whereof I have hereunto set my hand.

WILHELM PUNGS.